US012650736B2

(12) United States Patent
Li et al.

(10) Patent No.: US 12,650,736 B2
(45) Date of Patent: Jun. 9, 2026

(54) OPTICAL POSITIONING SYSTEMS AND METHODS

(71) Applicant: TEXAS INSTRUMENTS INCORPORATED, Dallas, TX (US)

(72) Inventors: Ting Li, Allen, TX (US); Rahmi Hezar, Allen, TX (US); Srinath Mathur Ramaswamy, Murphy, TX (US); Anand Dabak, Plano, TX (US); Baher Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/235,335

(22) Filed: Dec. 28, 2018

(65) Prior Publication Data

US 2020/0209984 A1      Jul. 2, 2020

(51) Int. Cl.
| | |
|---|---|
| *G06F 3/03* | (2006.01) |
| *G01S 7/486* | (2020.01) |
| *G01S 7/4861* | (2020.01) |
| *G01S 17/48* | (2006.01) |
| *G06F 3/0346* | (2013.01) |
| *G06F 3/038* | (2013.01) |
| *G06F 3/041* | (2006.01) |
| *G06F 3/042* | (2006.01) |
| *G06F 3/0354* | (2013.01) |

(52) U.S. Cl.
CPC .......... *G06F 3/0325* (2013.01); *G01S 7/4861* (2013.01); *G01S 17/48* (2013.01); *G06F 3/0346* (2013.01); *G06F 3/038* (2013.01);

*G06F 3/0418* (2013.01); *G06F 3/0421* (2013.01); *G06F 3/03545* (2013.01)

(58) Field of Classification Search
None
See application file for complete search history.

(56) References Cited

U.S. PATENT DOCUMENTS

| | | | | | |
|---|---|---|---|---|---|
| 5,012,049 | A | * | 4/1991 | Schier ................. | G06V 30/228 |
| | | | | | 178/19.06 |
| 9,430,688 | B1 | * | 8/2016 | Ray .......................... | G06K 9/38 |
| 10,410,027 | B1 | * | 9/2019 | Song ...................... | G06F 16/29 |

(Continued)

*Primary Examiner* — Benjamin C Lee
*Assistant Examiner* — Emily J Frank
(74) *Attorney, Agent, or Firm* — Zhenhai Fu; Frank D. Cimino

(57) ABSTRACT

An optical position sensing system is disclosed. The system includes a substrate having a surface. A plurality of photodetectors are at multiple locations across the surface, each of the plurality of photodetectors providing detector pulse signals in response to receiving the light. The system further includes a processor that determines a phase shift between the transmitted light pulse signals and the respective detector pulse signals and applies a multi-path resolution operation to distinguish between the detector pulse signals representing the transmitted light pulse signals and those representing reflected light pulse signals. The processor also calculates a distance of a transmitting device from each of the photodetectors based on the determined phase shift and the multi-path resolution operation and calculates a multi-dimensional position of the transmitting device relative to the substrate based on the calculated distances.

23 Claims, 8 Drawing Sheets

(56)                References Cited

U.S. PATENT DOCUMENTS

| | | | | |
|---|---|---|---|---|
| 2004/0102869 A1* | 5/2004 | Andersen | G06K 19/07749 | 700/215 |
| 2007/0126716 A1* | 6/2007 | Haverly | G06F 3/03545 | 345/179 |
| 2009/0023392 A1* | 1/2009 | Iizuka | H04W 52/0225 | 455/65 |
| 2011/0279366 A1* | 11/2011 | Lohbihler | G01S 11/14 | 345/157 |
| 2013/0033381 A1* | 2/2013 | Breed | B60T 7/16 | 340/568.1 |
| 2013/0155816 A1* | 6/2013 | Li | G01S 3/80 | 367/127 |
| 2014/0009341 A1* | 1/2014 | Botteron | G01S 5/021 | 342/463 |
| 2014/0208845 A1* | 7/2014 | Zlotnick | G01F 23/296 | 73/290 V |
| 2015/0253428 A1* | 9/2015 | Holz | G01S 17/36 | 356/5.01 |
| 2015/0341077 A1* | 11/2015 | Krasner | G01S 19/46 | 375/142 |
| 2017/0346563 A1* | 11/2017 | Steinkraus | H04B 10/118 | |
| 2018/0292516 A1* | 10/2018 | Xu | G01S 17/10 | |
| 2018/0306908 A1* | 10/2018 | Meng | G01S 7/4865 | |
| 2019/0011928 A1* | 1/2019 | Ouyang | G05D 1/0229 | |
| 2019/0155411 A1* | 5/2019 | Kinrot | G06F 3/0383 | |
| 2019/0372975 A1* | 12/2019 | Schwindt | H04L 63/0876 | |
| 2020/0106527 A1* | 4/2020 | Sano | G02F 1/015 | |
| 2020/0124698 A1* | 4/2020 | Noujeim | G01S 13/931 | |
| 2020/0128357 A1* | 4/2020 | Kim | H04W 4/025 | |
| 2020/0182959 A1* | 6/2020 | Markhovsky | G01S 19/05 | |
| 2020/0343938 A1* | 10/2020 | Medina Acosta | H04L 27/2607 | |
| 2021/0091863 A1* | 3/2021 | Tang | H04B 17/12 | |
| 2021/0141051 A1* | 5/2021 | Booij | G01S 5/18 | |
| 2021/0263137 A1* | 8/2021 | Dehlinger | G01S 17/26 | |

* cited by examiner

100

102 106 112

325

310

305

302

304

305

310

326

305

305

307

310

305

308 306

328

307

310

324

300

700

800

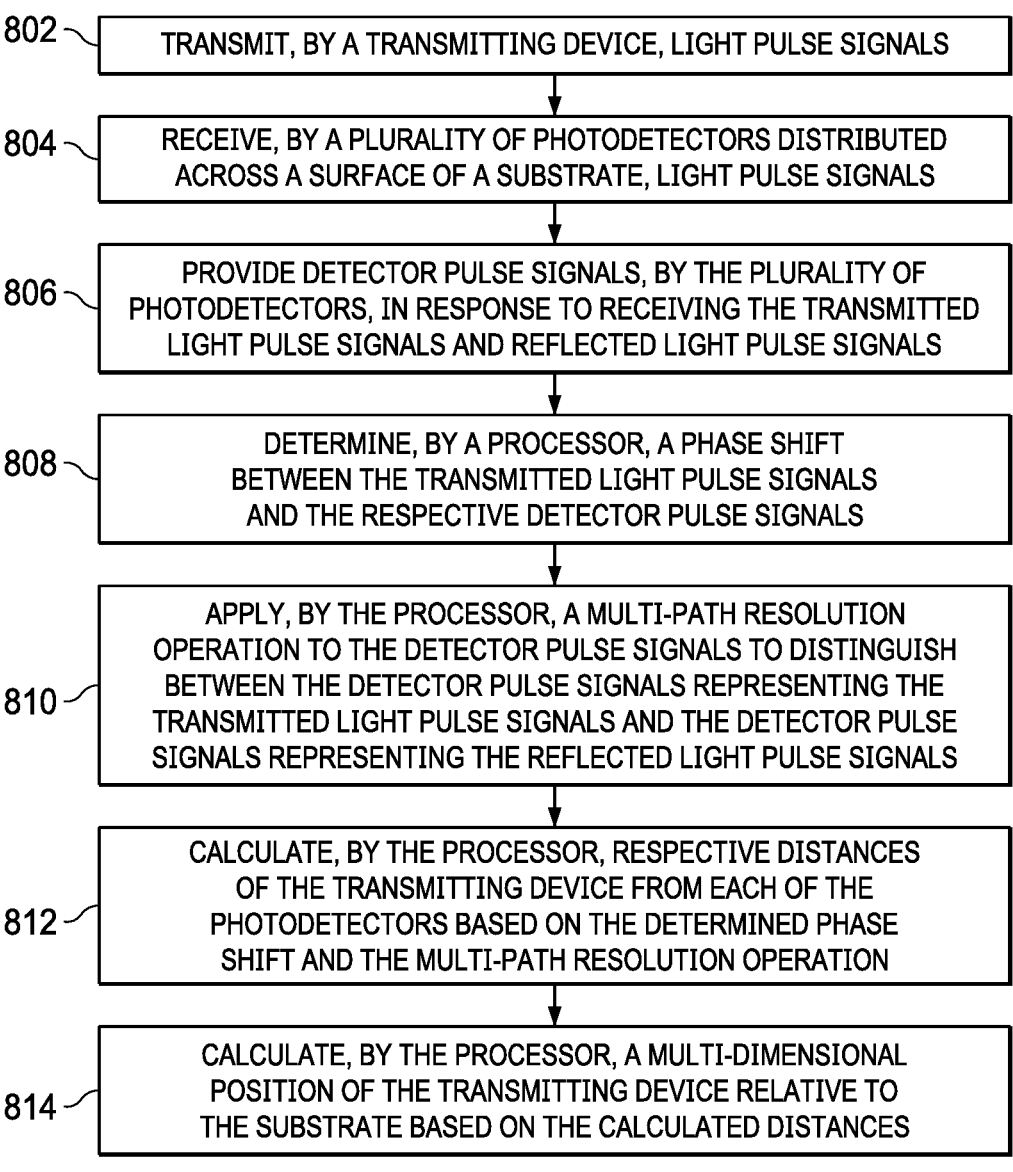

802 — TRANSMIT, BY A TRANSMITTING DEVICE, LIGHT PULSE SIGNALS

804 — RECEIVE, BY A PLURALITY OF PHOTODETECTORS DISTRIBUTED ACROSS A SURFACE OF A SUBSTRATE, LIGHT PULSE SIGNALS

806 — PROVIDE DETECTOR PULSE SIGNALS, BY THE PLURALITY OF PHOTODETECTORS, IN RESPONSE TO RECEIVING THE TRANSMITTED LIGHT PULSE SIGNALS AND REFLECTED LIGHT PULSE SIGNALS

808 — DETERMINE, BY A PROCESSOR, A PHASE SHIFT BETWEEN THE TRANSMITTED LIGHT PULSE SIGNALS AND THE RESPECTIVE DETECTOR PULSE SIGNALS

810 — APPLY, BY THE PROCESSOR, A MULTI-PATH RESOLUTION OPERATION TO THE DETECTOR PULSE SIGNALS TO DISTINGUISH BETWEEN THE DETECTOR PULSE SIGNALS REPRESENTING THE TRANSMITTED LIGHT PULSE SIGNALS AND THE DETECTOR PULSE SIGNALS REPRESENTING THE REFLECTED LIGHT PULSE SIGNALS

812 — CALCULATE, BY THE PROCESSOR, RESPECTIVE DISTANCES OF THE TRANSMITTING DEVICE FROM EACH OF THE PHOTODETECTORS BASED ON THE DETERMINED PHASE SHIFT AND THE MULTI-PATH RESOLUTION OPERATION

814 — CALCULATE, BY THE PROCESSOR, A MULTI-DIMENSIONAL POSITION OF THE TRANSMITTING DEVICE RELATIVE TO THE SUBSTRATE BASED ON THE CALCULATED DISTANCES

FIG. 8

OPTICAL POSITIONING SYSTEMS AND METHODS

TECHNICAL FIELD

This disclosure relates to optical positioning systems and methods.

BACKGROUND

Systems and methods exist for detecting the position of interaction of a stylus with a surface, such as a display screen that itself may or may not be a touchscreen. One example method places accelerometers and/or gyroscope on a stylus to track motion of the stylus with respect to the screen. Another example approach implements optical angle sensing of the surface of the screen by the use of optical quadrant sensors distributed across the surface and detects the angle of the light source relative to the object on the screen to determine position.

SUMMARY

This disclosure relates to a system and method to implement an optical positioning system.

In one example, an optical position sensing system is disclosed. The system includes a substrate having a surface. A plurality of photodetectors are distributed at multiple locations across the surface of the substrate, each of the plurality of photodetectors being configured to provide detector pulse signals in response to receiving the light pulse signals. A processor is configured to determine a phase shift between the transmitted light pulse signals and the respective detector pulse signals and apply a multi-path resolution operation to the detector pulse signals to distinguish between the detector pulse signals representing the transmitted light pulse signals and the detector pulse signals representing reflected light pulse signals from one or more objects reflecting the transmitted light pulse signals. The processor also is configured to calculate a distance of the transmitting device from each of the photodetectors based on the determined phase shift and the multi-path resolution operation, and calculate a multi-dimensional position of the transmitting device relative to the substrate based on calculated distances.

In another example, a method for determining the position of an object is disclosed. The method includes receiving, by a plurality of photodetectors distributed across a surface of a substrate, light signals from a transmitting device and providing detector pulse signals, by the plurality of photodetectors, in response to receiving the transmitted light pulse signals and the reflected light pulse signals. The method also includes determining, by a processor, a phase shift between the transmitted light pulse signals and the respective detector pulse signals, applying, by the processor, a multi-path resolution operation to the detector pulse signals to distinguish between the detector pulse signals representing the transmitted light pulse signals and the detector pulse signals representing the reflected light pulse signals. The method also includes calculating, by the processor, a distance of the transmitting device from each of the photodetectors based on the determined phase shift and the multi-path resolution operation, and calculating, by the processor, a multi-dimensional position of the transmitting device relative to the substrate based on calculated distances.

In yet another example, an optical position sensing system includes a transmitting device configured to transmit light pulse signals. The system further includes a portable device controlled by the transmitting device via a user interface, the portable device comprising a substrate having a surface, the transmitting device being movable relative to the surface of the substrate. The system further includes a plurality of photodetectors at multiple locations across the surface of the substrate, each of the plurality of photodetectors being configured to provide detector signals in response to receiving light signals. The portable device includes a processor configured to at least determine a phase shift between the transmitted light pulse signals and the respective detector signals, apply a multi-path resolution operation to the detector pulse signals to distinguish between the detector pulse signals representing the transmitted light pulse signals and the detector pulse signals representing reflected light pulse signals from one or more objects reflecting the transmitted light pulse signals, calculate a distance of the transmitting device from each of the photodetectors based on the determined phase shift and the multi-path resolution operation, calculate a multi-dimensional position of the transmitting device relative to the substrate based on the calculated distances.

In another example, one or more non-transitory machine-readable media containing instructions executable by a processor to perform a method. The method includes determining a phase shift between light transmit data representing light pulse signals transmitted from a light transmitting device and light detection data representing light signals sensed by a plurality of photodetectors distributed across a surface of a substrate. The method also includes applying a multi-path resolution operation to the light detection data to distinguish between light detection data representing transmitted light pulse signals received directly from the light transmitting device and light detection data representing light pulse signals received from one or more objects reflecting the transmitted light pulse signals. The method also includes calculating a distance of the transmitting device from each of the plurality of photodetectors based on the determined phase shift and the multi-path resolution operation. The method also includes calculating a multi-dimensional position of the transmitting device relative to the surface of the substrate based on the calculated distances

BRIEF DESCRIPTION OF THE DRAWINGS

FIG. 8 is an example method for determining the position of an object.

DETAILED DESCRIPTION

Disclosed herein are systems and methods for implementing an optical positioning that is configured to detect and analyze multi-path optical signals to determine a multi-dimensional position of an object (e.g., a mouse or stylus). An example system includes a substrate having a surface (e.g., a tablet, penboard, laptop, smartphone, etc.). An object carrying a light source (e.g., a light emitting diode (LED) or other optical transmitting device) is moveable relative to the surface. The light source transmits a series of optical pulses. A plurality of photodetectors are located across the surface of the substrate. Each photodetector is configured to provide a detector signal in response to receiving light pulse signals. The photodetectors receive light pulses directly from the optical transmitting device as well as reflected light pulse signals reflecting the transmitted light pulses from nearby reflecting sources (e.g., a telephone, a coffee cup or the like), wherein the reflecting sources are stationary or moving.

Signal processing (e.g., frequency domain processing, such as Fast Fourier Transform (FFT) or MUltiple SIgnal Classification (MUSIC)) is performed to distinguish the transmitted optical pulse received at the photodetectors from corresponding reflections. The processing further can determine distance between the transmitting device and each of the photodetectors based on a detected phase shift (e.g., time of flight) measurement between the transmitted and received light pulses. A multi-dimensional position of the transmitting device relative to the substrate can then be computed from the determined distances (e.g., based on a triangulation).

Because the disclosed approach utilizes optical sensing, it can be more power efficient than systems employing other sensing methods such as microelectromechanical systems (MEMS) with an RF link (which require the system to be plugged into an outlet rather than be battery operated). Additionally, the disclosed systems and methods can determine multi-dimensional position more accurately than camera angle position sensing. Additionally, the signal processing utilized is able to compensate for reflected light signals that would otherwise interfere with detection of the transmitted light pulse signals of the transmitting device.

Figure 1:
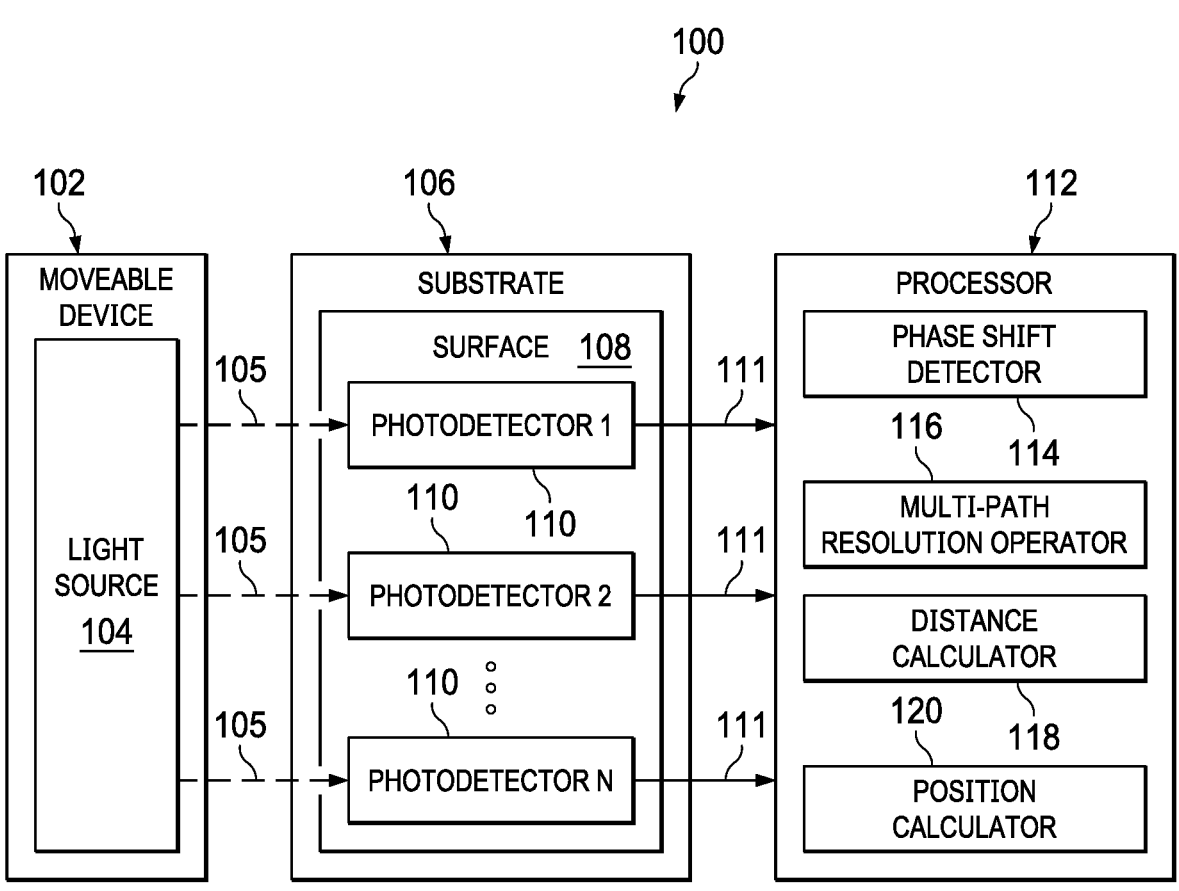
FIG. 1 is a block diagram of an example optical positioning system.

FIG. 1 is a block diagram of an example optical positioning system 100. The system 100 includes a moveable device 102 that includes a light source 104 configured to transmit light pulse signals 105. In some examples, the light source 104 includes a light emitting diode (LED). The light pulse signals 105 may be transmitted from the light source 104 of the moveable device 102 as a series of pulses having a fixed or variable frequency and/or duty cycle. In some examples, the transmitted light pulse signals 105 are amplitude modulated light pulses. The system 100 also includes a number of photodetectors 110 placed at spaced apart locations across a surface 108 of a substrate 106. In the example shown in FIG. 1, there are N photodetectors 110, where N is an integer greater than or equal to 2. In some examples, the photodetectors 110 are photodiodes, which may be spatially distributed around a periphery of the surface 108.

The moveable device 102 is movable (e.g., in three-dimensions) relative to the surface 108 of the substrate 106. For example, the moveable device 102 is a three-dimensional object, such as a stylus, pen, or three-dimensional (3D) mouse and the surface is a two-dimensional (e.g., planar) or three-dimensional (e.g., curved) surface. In some examples, the substrate is part of a device, which is controlled by the moveable device 102, such as in response to movement of the device 102 with respect to the surface and/or in response to activating one or more input devices (e.g., buttons or the like) mounted on the moveable device 202. As an example, the substrate 106 is a screen of a device, such as a tablet computer, penboard, laptop computer, or smartphone that is controlled by the moveable device (e.g., a moveable stylus) 102. In some examples, the moveable device 102 is battery operated. The design of the optical positioning system 100 is such that neither the moveable device 102 nor the device having the substrate 106 need to be plugged into an outlet. Each of the plurality of photodetectors 110 are configured to provide detector signals 111 in response to receiving the light pulse signals 105. In some examples, the moveable device 102 is configured to transmit the light pulse signals 105 with at least two frequencies.

The optical positioning system 100 also includes a processor 112, such as a digital signal processor. In some examples, the processor 112 resides within the device having the substrate 106 (e.g., the tablet computer, penboard, smartphone, etc.). In other examples, the processor 112 is external to the device having the substrate 106 (e.g., the processor 112 is in the cloud). The processor 112 can be implemented as dedicated hardware, software instructions executed by an associated processor, or a combination of software and dedicated hardware.

The processor 112 includes a variety of modules (e.g., executable code or logic implemented in hardware), including a phase shift detector 114, a multi-path resolution operator 116, a distance calculator 118, and a position calculator 120. The multi-path resolution operator 116 applies a multi-path resolution operation to the detector pulse signals to distinguish between the detector pulse signals representing the transmitted light pulse signals directly from the light source 104 and the detector signals representing reflected light pulse signals from one or more objects reflecting the transmitted light pulse signals. The phase shift detector 114 determines a phase shift between the transmitted light pulse signals 105 transmitted by the light source and the light pulse signals received by the photodetectors 110 as represented by the respective detector signals 111 generated by the photodetectors 110. For example, the phase shift calculator can be applied to the signals after removing reflection interference by application of the multi-path resolution operator 116 to the detector signals 111. In some examples, the processor 112 is configured to determine the phase shift according to an indirect time of flight (ToF) measurement for the light pulses received at each of the photodetectors 110. The processor 112 is also configured to compute the distance between each photodetector 110 and the movable device 102 to cancel phase shift between the transmitted and received light pulse signals 105. Also, in some examples, the multi-path resolution operator 116 is applied to identify actual signals directly received from the light source 104 and to detect a phase shift from those signals, as well as a distance from such phase shifts.

In an example, one or more of the photodetectors 110 are configured to be redundant photodetectors at a known spatial location with respect to the other photodetectors on the surface 108. The redundant photodetector is configured to receive the transmitted light pulse signals 105 and reflected light pulse signals. By using the redundant photodetector, the optical positioning system 100 is able (e.g., through a set of equations described below) to determine a phase difference (e.g., a phase offset) between the transmitted light pulse signals 105 and the received light pulse signals. As described below, the use of the redundant photodetector(s) 110 enables the processor 112 to determine a position error based on the phase difference, and which is used to calculate a corrected position for the moveable device 102 based on the position error and the multi-dimensional position of the moveable device 102. Thus, the redundant photodetector(s) improves accuracy based on the phase offset that is determined from the information from each redundant photodetector.

Examples of the multi-path resolution operator 116 include FFT and MUSIC. In some examples, the multi-path resolution operator 116 includes a two-dimensional spatial smoothing MUSIC operation. MUSIC resolves multipath signals by estimating a noise subspace from available samples. Noise, in the context of the optical positioning system 100, relates to reflected signals rather than the transmitted signals 105. MUSIC estimates the noise subspace by either eigenvalue decomposition of an estimate array correlation matrix or a singular value decomposition of a matrix comprising the transmitted signals 105. Once the noise subspace has been estimated, MUSIC searches for angle pairs by looking for steering vectors that are as orthogonal to the noise subspace as possible. MUSIC is applied at each photodetector 110. The distance calculator 118 calculates a distance of the moveable device 102 from each of the photodetectors 110 based on the determined phase shift and the multi-path resolution operation. The position calculator 120 calculates a multi-dimensional position of the moveable device 102 relative to the substrate 106 based on calculated distances, and in some examples, based on a triangulation of the calculated distances. In some examples, each of the phase shift detector 114, the multi-path resolution operator 116, the distance calculator 118, and the position calculator 120 is implemented as machine-readable instructions stored in a non-transitory media, which is executed by the processor 112.

Accordingly, in the example optical positioning system 100 of FIG. 1, the moveable device 102 (e.g., a 3D mouse or stylus) transmits light pulse signals 105 that are received by photodetectors 110 placed at multiple locations of a surface 108 of the substrate 106. In one example, the light pulse signals 105 are infrared (IR). Additionally or alternatively, in other examples, the light pulse signals 105 are visible. The substrate 106 could be part of a main unit such as a laptop or smartphone that includes a receiver system that includes the photodetectors 110. The receiver system at the main unit extracts the position and movement information using a combination of spatial and frequency domain processing. Using this method, a module with photodetectors (e.g., four photodetectors) can sense position and movement while staying synchronized with the transmitting moveable device 102. Compared to an MEMS+RF system, the optical positioning system 100 consumes very little energy (e.g., from a battery). Optical sensing in general is more accurate and power efficient compared to other methods. One of the technical challenges preventing the use of optical methods is possible accuracy reduction that can occur in the presence of reflecting surfaces near the main unit and/or the moveable device (e.g., mouse/stylus). Reflections from these surfaces create late arrivals of the transmitted light such that the processor 112 cannot calculate an accurate distance of the moveable device 102 from the substrate 106. Together with the spatial information the use of multi-path resolution algorithms can separate the main optical pulse arrival from the reflections to provide robust optical positioning systems and methods to detect position and movement of the moveable device 102.

Figure 2:
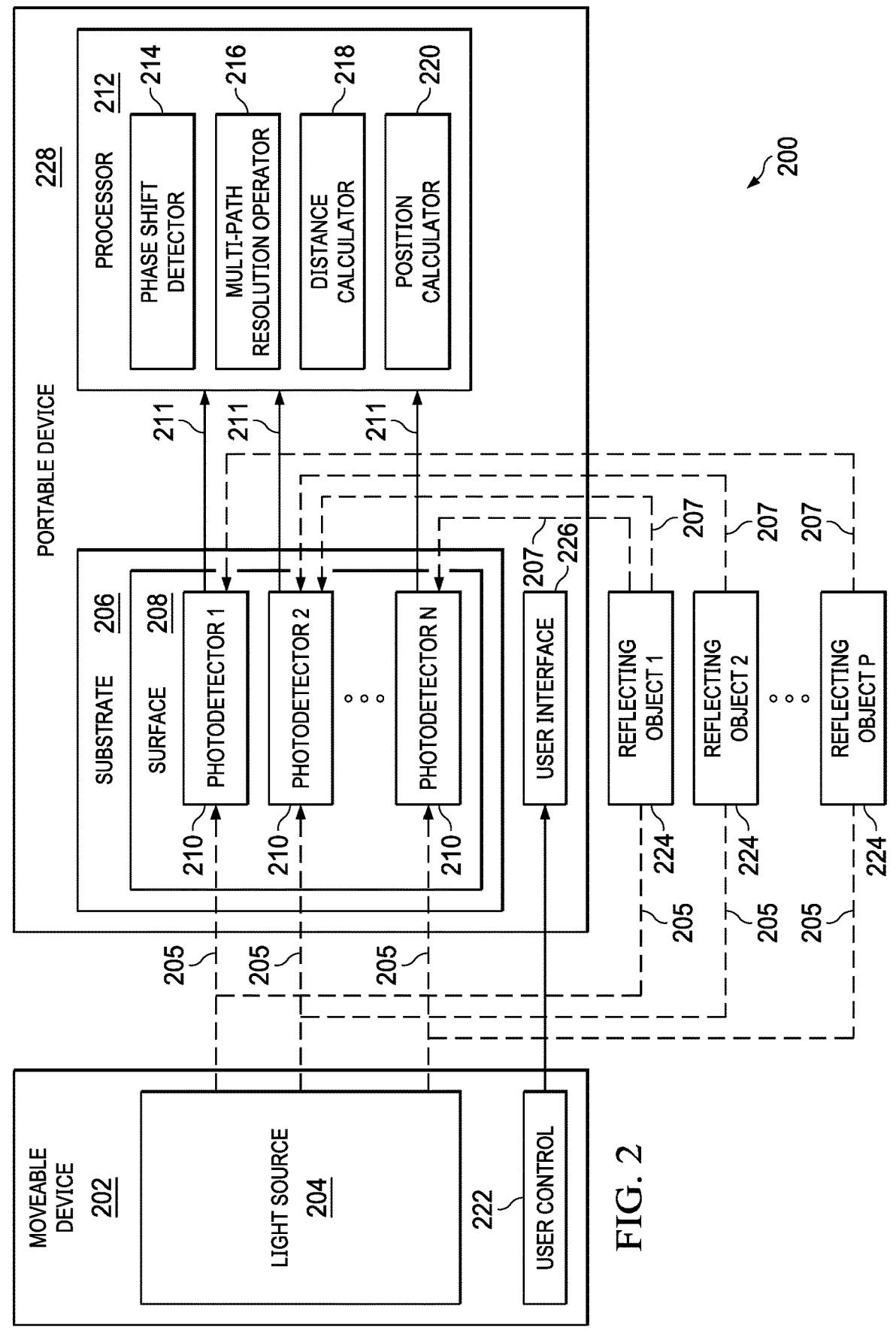
FIG. 2 is a block diagram of another example optical positioning system.

FIG. 2 is a block diagram of another example optical positioning system 200. The optical positioning system 200 is similar to the optical positioning system 100 of FIG. 1, and operates similarly. In this example, the substrate 206 is a part of a portable device 228, such as a smartphone or laptop. Also, the optical positioning system 200 schematically depicts P reflecting objects 224 (where P is a positive integer) as well as reflected light pulse signals 207 that are reflected by the reflecting objects 224. The reflected light pulse signals 207 are received by a number of photodetectors 210 distributed across a surface 208 of a substrate 206. The moveable device 202 also includes a user control 222 that is in communication with a user interface 226 of the portable device 228, such as through a communications link (e.g., a physical or wireless link).

The moveable device 202 includes a light source 204 configured to transmit light pulse signals 205 (e.g., visible and/or IR light). In some examples, the light source 204 includes a light emitting diode (LED) to transmit the light pulse signals 205. The light pulse signals 205 may be transmitted from the light source 204 of the moveable device 202 as a series of amplitude modulated light pulses having a fixed or variable frequency and/or duty cycle.

The photodetectors 210 placed at spaced apart locations across the surface 208 of the substrate 206. In the example shown in FIG. 2, there are N photodetectors 210, where N is an integer greater than or equal to 2. In some examples, the photodetectors 210 are photodiodes, which may be spatially distributed around a periphery of the surface 208. In FIG. 2, the substrate 206 is part of a portable device 228 such as a smartphone or laptop, and the substrate 206 is the screen of the portable device 228, and the photodetectors 210 are positioned at or near corners of the periphery of the screen. In some examples, the moveable device 202 is configured to transmit the light pulse signals 205 with at least two frequencies. Each of the plurality of photodetectors 210 are configured to provide detector signals 211 in response to receiving the light pulse signals 205 and in response to receiving the reflected light pulse signals 207.

The moveable device 202 is movable (e.g., in three-dimensions) relative to the surface 208 of the substrate 206 and the positioning system can determine a 3D position. For example, the moveable device 202 is a 3D object, such as a stylus, pen, or 3D mouse and the surface 208 is a two-dimensional (e.g., planar) or 3D (e.g., curved) surface. The portable device 228 has a user interface 226 that includes controls such as icons and buttons enabling a user to interact with features and applications of the portable device 228. The portable device 228 is controlled by the moveable device 202, such as in response to movement of the moveable device 202 with respect to the surface and/or in response to activating one or more input devices (e.g., buttons or the like) mounted on the moveable device 202. For example, the user control 222 includes one or more such input devices to control the portable device 228. In some examples, the one or more input devices of the user control 222 also control the moveable device 202, such as to change the font of the typeface applied by the moveable device 202 (such as, for example, if the moveable device 202 is a stylus). In some examples, the moveable device 202 is battery operated and separate from (e.g., not physically tethered to) the portable device 228. The design of the optical positioning system 200 is such that neither the moveable device 202 nor the portable device 228 having the substrate 206 need to be plugged into an outlet.

The optical positioning system 200 also includes a processor 212, such as a digital signal processor. In FIG. 2, the processor 212 resides within the portable device 228 (e.g., the tablet computer, smartphone, etc.). The processor 212 can be implemented as hardware, software instructions executable by an associated processor, or a combination of software and hardware.

In this example, the processor 212 includes a variety of modules (e.g., executable code and/or logic implemented in hardware), including a phase shift detector 214, a multi-path resolution operator 216, a distance calculator 218, and a position calculator 220. The multi-path resolution operator 216 applies a multi-path resolution operation to the detector pulse signals 211 to distinguish between the detector pulse signals representing the transmitted light pulse signals 205 directly from the light source 204 and the detector signals representing the reflected light pulse signals 207 from the one or more reflecting objects 224. The phase shift detector 214 determines a phase shift between the transmitted light pulse signals 205 transmitted by the light source 204 and the light pulse signals received by the photodetectors 210 as represented by the respective detector signals 211 generated by the photodetectors 210. For example, the phase shift detector 214 can be applied to the signals after removing reflection interference by application of the multi-path resolution operator 216 to the detector signals 211. In some examples, the processor 212 is configured to determine the phase shift according to an indirect ToF measurement for the light pulses received at each of the photodetectors 210. The processor 212 is also configured to compute the distance between each photodetector 210 and the movable device 202 to cancel phase shift between the transmitted and received light pulse signals 205. Also, in some examples, the multi-path resolution operator 216 is applied to identify actual signals directly received from the light source 204 and to detect a phase shift from those signals, as well as a distance from such phase shifts.

In an example, one or more of the photodetectors is configured to be a redundant photodetector. The redundant photodetector is configured to receive the transmitted light pulse signals 205 and the reflected light pulse signals 207. By using the redundant photodetector, the optical positioning system 200 is able to determine a phase difference between the transmitted light pulse signals 205 and the received light pulse signals. The processor 212 then determines a position error based on the phase difference and calculates a corrected position for the moveable device 202 based on the position error and the multi-dimensional position of the moveable device 202.

Examples of the multi-path resolution operator 216 include FFT and MUSIC. In some examples, the multi-path resolution operation 216 includes a two-dimensional spatial smoothing MUSIC operation, such as described with respect to FIG. 1. The distance calculator 218 calculates a distance of the moveable device 202 from each of the photodetectors 210 based on the determined phase shift and the multi-path resolution operation. The position calculator 220 calculates a multi-dimensional position of the moveable device 202 relative to the substrate 206 based on calculated distances, and in some examples, based on a triangulation of the calculated distances. In some examples, each of the phase shift detector 214, the multi-path resolution operator 216, the distance calculator 218, and the position calculator 220 is implemented as machine-readable instructions stored in a non-transitory media, which is executed by the processor 212.

Figure 3:
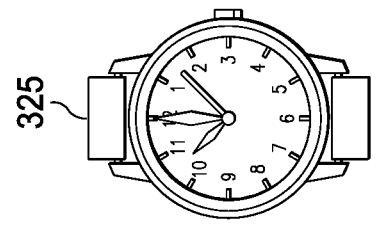
FIG. 3 is an illustration of an example environment of an optical positioning system.

FIG. 3 illustrates of an example environment 300 of an optical positioning system. The example environment 300 demonstrates an example implementation of the optical positioning system and optical positioning methods disclosed herein, such as the optical positioning system 100 of FIG. 1, system 200 of FIG. 2 and method 900 of FIG. 9.

For example, the environment 300 includes a three-dimensional movable stylus 302. The stylus 302 transmits light pulse signals 305 via a light source 304 located at a distal end of the stylus. Also shown is a portable tablet computer 328 such as may include various applications 326 that may be activated in response to a user input via the moveable stylus 302 and executed by a processor (not shown). The tablet computer 328 includes a substrate 306 having a surface 308. The stylus 302 is moveable relative to the surface 308 of the substrate 306. In this example, a plurality of (e.g., four) photodetectors 310 are placed at the edge of each corner of the surface 308 of the substrate 306. Each of the four photodetectors 310 is configured to provide detector pulse signals in response to receiving the light pulse signals 305 from the light source 304.

The environment 300 also includes reflecting objects 324 and 325 that reflect the light pulse signals 305 as reflected light pulse signals 307 transmitted by the stylus 302. In this example, one of the reflecting objects is a coffee mug 324, which is a temporarily stationary reflecting object (the coffee mug 324 is mostly stationary but can move as the person takes a sip of coffee). The other reflecting object is a watch 325, which is a non-stationary reflecting object. For example, the watch 325 (or another object) moves as the user moves his or her arm where the watch is secured. Other stationary or moveable objects can reflect light from the light source 304. The photodetectors 310 receive both the transmitted light pulse signals 305 and the reflected light pulse signals 307.

The processor of the tablet computer 328 executes instructions (e.g., program code 214, 216, 218 and 220) to determine position of a distal end of the stylus 302 relative to the screen. For example, the processor determines a phase shift between the transmitted light pulse signals 305 and the respective detector pulse signals. The processor also applies a multi-path resolution operation to the detector pulse signals to distinguish between the detector pulse signals representing the transmitted light pulse signals 305 and the detector pulse signals representing the reflected light pulse signals 307 from the objects 324 and 325 reflecting the transmitted light pulse signals 305. The processor further calculates a distance of the stylus 302 from each of the photodetectors 310 based on the determined phase shift and the multi-path resolution operation. The processor further calculates a multi-dimensional position of the stylus 302 relative to the substrate 306 based on the calculated distances.

Figure 4:
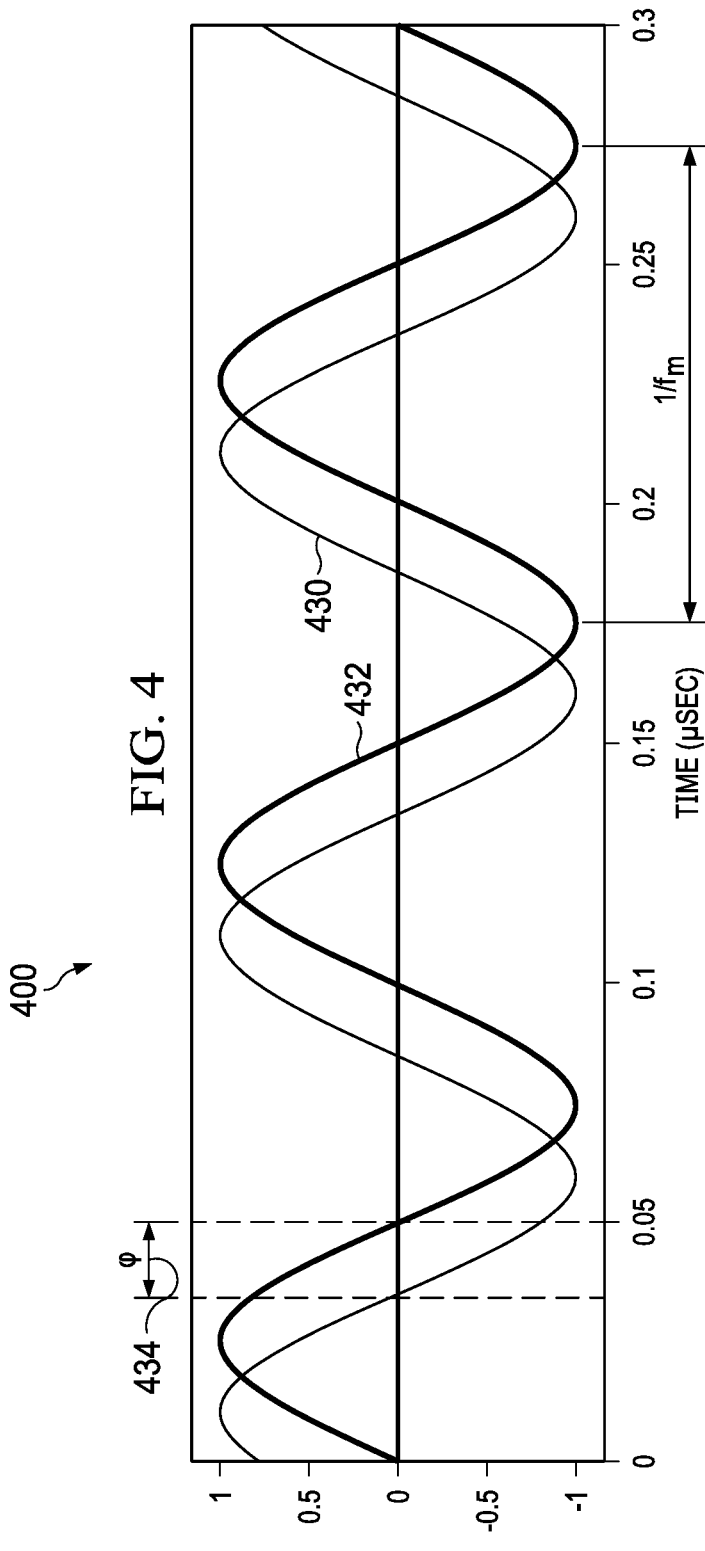
FIG. 4 is a graph illustrating an example phase shift between a transmitted light pulse signal and a respective detected light pulse signal.

FIG. 4 is a graph 400 illustrating an example phase shift between a transmitted light pulse signal 430 and a respective detected light pulse signal 432. A phase shift between the transmitted and detected light pulse signals 430 and 432, denoted as φ at 434, is shown in FIG. 4 to be approximately 0.016 microseconds. Each signal has been normalized to an amplitude of approximately 2.0 (units undefined), and the period of each signal is shown as $1/f_m$.

Figure 5:
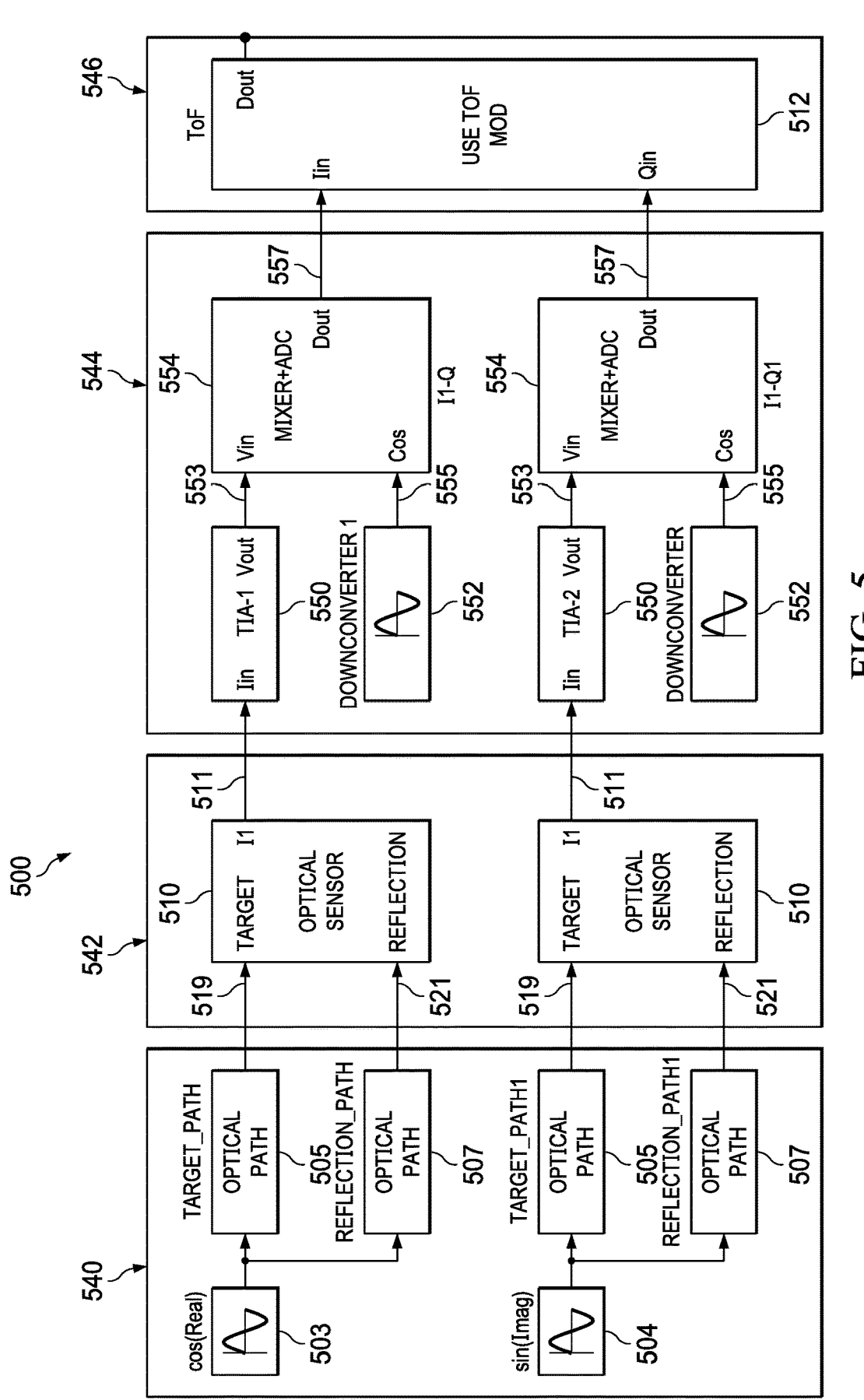
FIG. 5 is an example system model of an example optical positioning system.

FIG. 5 is an example of a front end of an optical positioning system 500, such as the optical positioning system 100 of FIG. 1 or system 200 of FIG. 2. The system 500 includes four major components of the optical positioning system, demonstrated as a signal portion 540, photodetector portion 542, analog front-end portion 544, and a processing portion 546. The signal portion 540 processes a real signal 503 and an imaginary signal 504. The real signal 503 and the imaginary signal 504 include both a transmitted pulse signal path 505 and a reflected pulse signal path 507. The transmitted pulse signal path 505 corresponds to the path of the signals transmitted by a moveable device (such as the moveable device 102 of FIG. 1), and the reflected pulse signal path 507 corresponds to the path of the signals reflected by reflecting objects (such as the reflecting objects 224 of FIG. 2). The photodetector portion 542 includes photodetectors 510 that each include an input 519 for the transmitted pulse signal paths 505 and an input 521 for the reflected pulse signal paths 507. The photodetectors 510 are placed at multiple locations across a surface of a substrate (e.g., the substrate of a stationary penboard or portable smartphone), where each of the plurality of photodetectors are configured to provide detector pulse signals 511 in response to receiving the light pulse signals.

The analog front-end portion 544 includes a transimpedance amplifier 550 coupled to each photodetector 510. The transimpedance amplifiers 550 receive as input the respective detector pulse signals 511. The output 553 of the transimpedance amplifiers 550, as well as the output 555 of a respective downconverter 552 is input to a respective mixer and analog to digital converter circuit 554. The processing portion 546 include time of flight (ToF) processing circuitry 512 that receives as input the output 557 of the digital converter mixers 554. The ToF processing circuitry 512 is configured to calculate an indirect time of flight to provide a measure of phase shift between the transmitted light pulse signals and the respective detector pulse signals.

The determined phase shift can be further processed by a digital processing system such as disclosed herein (see, e.g., FIGS. 1, 2 and 9). For example, the digital processing system applies a multi-path resolution operation with respect to the detector pulse signals 511 to distinguish between the detector pulse signals representing the transmitted light pulse signals and the detector pulse signals representing reflected light pulse signals from one or more objects reflecting the transmitted light pulse signals. The digital processing system also calculates a distance of the moveable device from each of the photodetectors 510 based on the determined phase shift and the multi-path resolution operation. The digital processing system further calculates a multi-dimensional position of the moveable device relative to the substrate based on the calculated distances.

Figure 6:
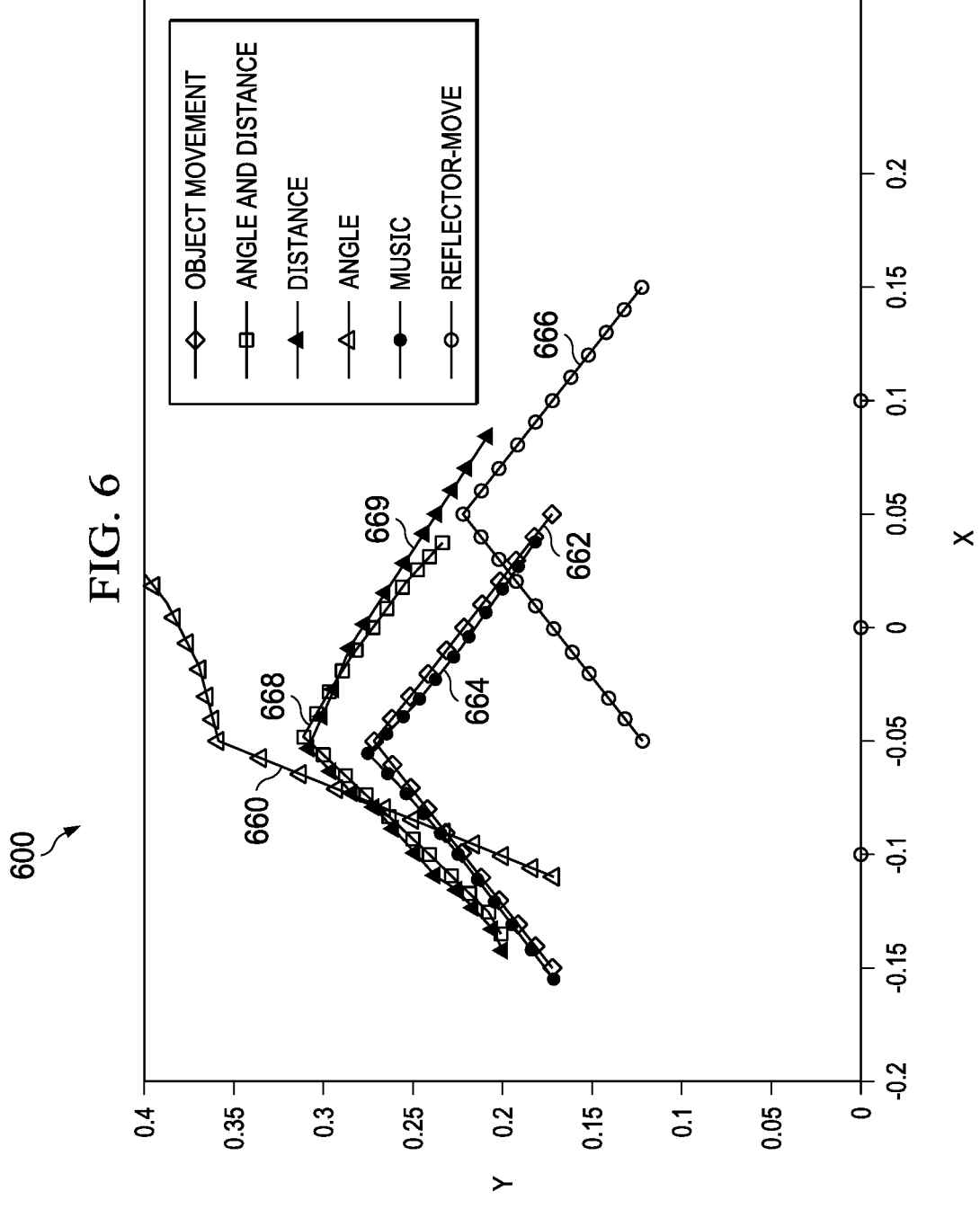
FIG. 6 is a graph showing a comparison of the performance of different methods used to track object position.

FIG. 6 is a graph 600 showing a comparison of the performance of different methods that may be used to track the position of a moveable object. The graph 600 was generated as a result of a simulation in which a stylus was moved in a triangular shape in the X-Y plane, starting at approximately x-y coordinate (−0.15, 0.16), then moving the stylus to the right and upwards in a straight line until reaching approximately x-y coordinate (−0.05, 0.275), then moving the stylus to the right and downwards in a straight line until reaching approximately x-y coordinate (0.05, 0.16). In the simulation, the stylus transmitted light pulse signals which were received by photodetectors placed along the surface of a substrate of a tablet computer (similar to the configuration shown in FIG. 3). Also during the simulation, two reflecting objects reflected light pulse signals transmitted by the stylus. The reflected light pulse signals were also received at the photodetectors. The reflectivity was measured to be approximately 0.7. In the simulation, bandwidth 250 MHz at 50-300 MHz, and the signal-to-noise ratio was 90 dB. Each of the photodetectors provided detector pulse signals in response to receiving the light pulse signals (transmitted and reflected light pulse signals), and a processor determined a phase shift between the transmitted light pulse signals and the respective detector pulse signals. The processor determined the phase shift according to an indirect ToF measurement for the light pulses received at each of the photodetectors. The central frequency in this example was 50 MHz for ToF.

The graph 600 shows the results of different methods using to track the position of the stylus. Each line shows the position determined by each method real-time as the stylus was moved in the triangular shape. The line 660 shows the position of the stylus as determined by an angle sensing method. In angle sensing, the position of the stylus is determined from a combination of multiple cameras that sense the angle of the light pulse signals transmitted by the stylus. The line 662 shows the actual position of the stylus as it was being moved. The line 664 shows the position of the stylus as determined by an MUSIC method for performing a multi-path resolution operation to distinguish between the detector pulse signals representing the transmitted light pulse signals and the detector pulse signals representing reflected light pulse signals from the cup and watch reflecting the transmitted light pulse signals. The line 666 shows the position of a reflecting object, which was also moved in a triangular shape in the X-Y plane. The line 668 shows the position of the stylus as determined by a combination of an angle sensing and distance method. The line 669 shows the position of the stylus as determined by a distance method. As shown in FIG. 6, the MUSIC multi-path resolution operation method tracks the position of the stylus with at least 15% better accuracy than the other simulated methods as the stylus is moved in the X-Y plane.

Figure 7:
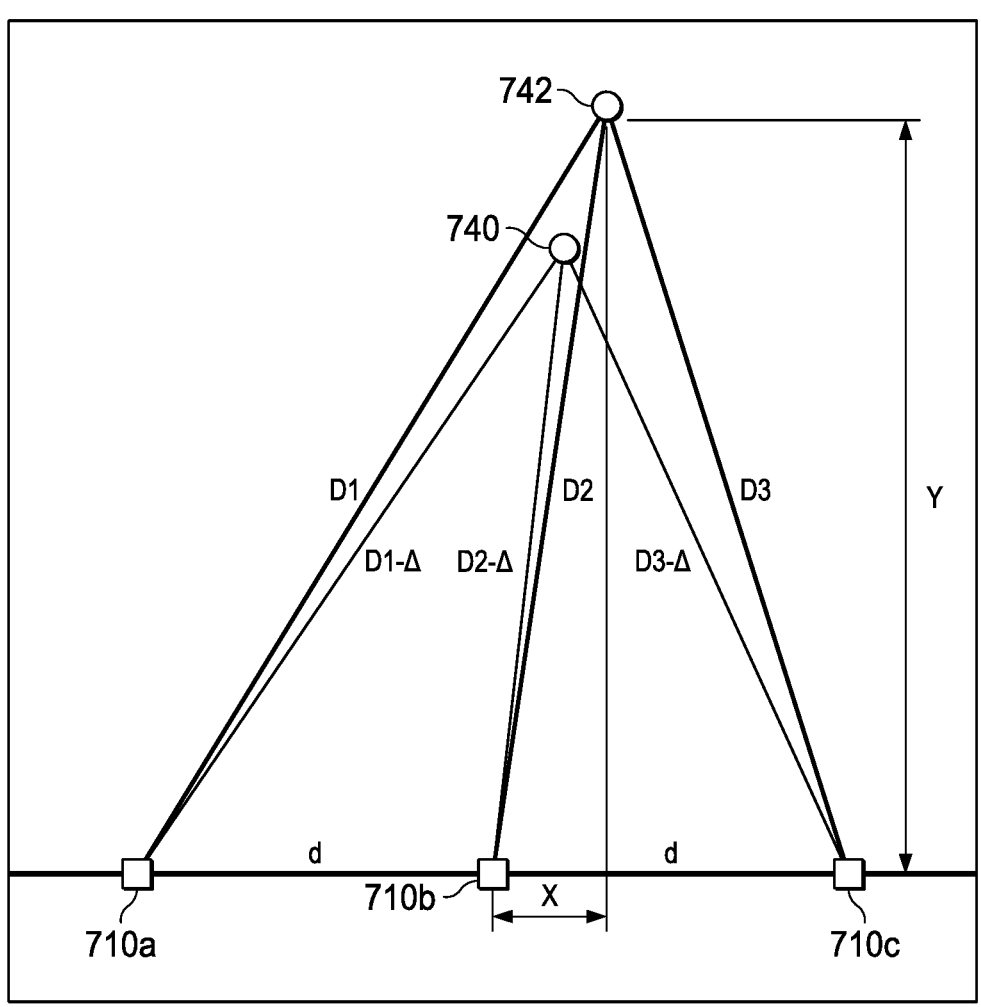
FIG. 7 is an illustration of correcting a phase shift error between a transmitted light pulse signal and a respective detector pulse signal.

FIG. 7 is an illustration of correcting position for a moveable device that is determined based on transmitted light pulse signals and detected light pulse signals. An unknown phase difference between the transmitted light pulse signals and the received light pulse signals at the photodetectors 710 results in a distance error Δ. This distance error, if left uncorrected, may result in errors in the calculated position of the moveable object by the optical position sensing systems and methods disclosed herein. FIG. 7 shows uncorrected position 742, which is the position of the moveable device (e.g., in 2D or 3D spatial coordinates) sensed without correcting for the distance error. FIG. 7 also shows the corrected position 740, which is the position of the moveable device sensed after correcting for the distance error. The corrected position 740 represents the actual position of the moveable device (e.g., the moveable device 102 of FIG. 1).

In FIG. 7, the movable device transmits light pulse signals that are received by the photodetectors 710. The distance between the photodetectors is represented by "d". In this example, the distance between each adjacent pair of the photodetectors 710a and 710b as well as between 710b and 710c is the same fixed distance "d". Other distances between photodetectors may be used in other examples. FIG. 7 shows that the distance between the movable device at the uncorrected position 742 and the first photodetector 710a is D1, the distance between the movable device at the uncorrected position 742 and the second photodetector 710b is D2, and the distance between the movable device at the uncorrected position 742 and the third photodetector 710c is D3. The distance error due to phase offset is denoted by the symbol Δ. FIG. 7 shows that the distance between the movable device at the corrected position 740 and the first photodetector 710a is D1−Δ, the distance between the movable device at the corrected position 740 and the second photodetector 710b is D2−Δ, and the distance between the movable device at the corrected position 740 and the third photodetector 710c is D1−Δ. For each photodetector 710, "x" represents the horizontal distance between the photodetector 710 and the moveable device at the uncorrected position 742, and "y" represents the vertical distance between the photodetector 710 and the moveable device at the uncorrected position 742.

As one example, which implements single-tone phase error cancellation, θ corresponds to phase offset between the transmitted signal and the signal received at the photodetectors 710. The transmission signal position of the moveable object at a given time is calculated by the processor (such as the processor 112 of FIG. 1) as the intersection of D1, D2, and D3. However, the phase offset cause error in the distance calculations, such that D1, D2, and D3 are defined by Equation 1, Equation 2, and Equation 3, respectively:

$$D1 = \frac{c(\phi_1 + \theta)}{4\pi f_m} = \frac{c\phi_1}{4\pi f_m} + \frac{\theta}{4\pi f_m} \qquad \text{Equation 1}$$

$$D2 = \frac{c\phi_2}{4\pi f_m} + \Delta \qquad \text{Equation 2}$$

$$D3 = \frac{c\phi_3}{4\pi f_m} + \Delta \qquad \text{Equation 3}$$

In Equation 1, Equation 2, and Equation 3, $\Delta = \theta/(4\pi f_m)$. Even if the phase error $\theta$ is not exactly known, fortunately, the distance error $\Delta$ can be calculated from D1, D2, and D3 using System of Equations 1 shown below:

$$(x + d)^2 + y^2 = (D1 - \Delta)^2 \qquad \text{Systems of Equations 1}$$

$$x^2 + y^2 = (D2 - \Delta)^2$$

$$(x - d)^2 + y^2 = (D3 - \Delta)^2$$

Using System of Equations 1, the distance error $\Delta$ can be calculated using Equation 4:

$$\Delta = \frac{2d^2 + 2(D2)^2 - (D1)^2 - (D3)^2}{4D2 - 2D1 - 2D3} \qquad \text{Equation 4}$$

The corrected position 740 of the moveable device is calculated as a triangulation of D1–$\Delta$, D2–$\Delta$, and D3–$\Delta$.

In an example where multi-tone phase error cancellation is implemented to eliminate the initial phase shift, instead of using three photodetectors (in two-dimensional (2D) space), to eliminate the phase offset due to the transmitted signal and the signal received at the photodetectors, two tones and two receiver sensors are implemented, as defined by Equation 5:

$$\text{angle}\left( R\sin\left( 2\pi f_1\left( t + \frac{d}{c} \right) + \theta \right) \right) - \text{angle}\left( R\sin\left( 2\pi f_2\left( t + \frac{d}{c} \right) + \theta \right) \right) \qquad \text{Equation 5}$$

Then, the distance measured from the modified multi-tone time of flight (ToF) will be defined by Equation 6 and Equation 7, such that the phase offset is calculated and removed from each of Equation 6 and Equation 7:

$$D1 = \frac{c\phi_1}{4\pi(f_{m1} - f_{m2})} \qquad \text{Equation 6}$$

$$D2 = \frac{c\phi_2}{4\pi(f_{m1} - f_{m2})} \qquad \text{Equation 7}$$

The transmitted location in 2-D space is calculated from the intersection of D1 and D2. For three dimensions (3D) such as that shown in FIG. 7, a third sensor is needed.

In view of the foregoing structural and functional features described above, a method will be better appreciated with reference to FIG. 8. While, for purposes of simplicity of explanation, the method of FIG. 8 is shown and described as executing serially, it is to be understood and appreciated that the present invention is not limited to the illustrated order. Moreover, not all illustrated features may be required to implement a method. Additionally, some actions may be implemented as machine readable instructions stored in non-transitory memory that are executed by one or more processors.

FIG. 8 is flow diagram depicting an example method 800 for determining the position of an object. The method 800 is, for example, implemented by the optical positioning system 100 of FIG. 1 or system 200 of FIG. 2. At 802, a transmitting device transmits light pulse signals. The transmitted light pulse signals are amplitude modulated light pulses. In some examples, the transmitting device transmits the light pulse signals with at least two frequencies.

At 804, a plurality of photodetectors distributed across a surface of a substrate receives the transmitted light pulse signals. At 806, the plurality of photodetectors provides respective detector pulse signals in response to receiving the transmitted light pulse signals and reflected light pulse signals. In an example, one of the photodetectors is configured to be a redundant photodetector that receives the transmitted light pulse signals and the reflected light pulse signals.

At 808, a processor determines a phase shift between the transmitted light pulse signals and the respective detector pulse signals. In some examples, the processor determines the phase shift according to an indirect ToF measurement for the light pulses received at each of the plurality of photodetectors. At 810, the processor applies a multi-path resolution operation to the detector pulse signals to distinguish between the detector pulse signals representing the transmitted light pulse signals and the detector pulse signals representing the reflected light pulse signals. In some examples, the multi-path resolution operation includes a two-dimensional spatial smoothing MUSIC operation. At 812, the processor calculates respective distances of the transmitting device from each of the photodetectors based on the determined phase shift and the results of the multi-path resolution operation. In particular, because the transmitting device transmits the light pulse signals with at least two frequencies, the processor computes the distance between each photodetector and the transmitting device to cancel the phase shift between the transmitted and received light pulse signals. At 814, the processor calculates a multi-dimensional position of the transmitting device relative to the substrate based on the calculated distances. In some examples, the processor calculates the multi-dimensional position of the transmitting device relative to the substrate based on a triangulation of the calculated distances. The processor further determines a position error based on a phase difference between the transmitted light pulse signals and the received light pulse signals. The processor then calculates a corrected position of the transmitting device based on position error and the multi-dimensional position of the transmitting device.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical position sensing system, comprising:
a substrate having a surface;
a first photodetector at a first location on the surface and configured to detect a first light signal;
a second photodetector at a second location on the surface and configured to detect a second light signal;
a third photodetector at a third location on the surface and configured to detect a third light signal; and
a processor configured to:
determine a first phase difference between a fourth light signal transmitted by an object and the first light signal;
determine a second phase difference between the fourth light signal and the second light signal;
determine a third phase difference between the fourth light signal and the third light signal;
determine a phase error component associated with each of the first, second, and third phase differences based on estimated distances corresponding to the first, second, and third phase differences, a first distance between the first and second photodetectors calculated based on coordinates of the first and second locations, and a second distance between the second and third photodetectors calculated based on coordinates of the second and third locations;
remove the determined phase error component from each of the first, second, and third phase differences; and
provide a fourth location of the object with respect to the first, second, and third locations based on the first, second, and third phase differences each having the determined phase error component removed.

2. The optical position sensing system of claim 1, wherein:
the first phase difference includes: a first propagation component due to a propagation of the fourth light signal from the object to the first photodetector and detected as the first light signal; and the phase error component;
the second phase difference includes: a second propagation component due to a propagation of the fourth light signal from the object to the second photodetector and detected as the second light signal; and the phase error component;
the third phase difference includes: a third propagation component due to a propagation of the fourth light signal from the object to the third photodetector and detected as the third light signal; and the phase error component; and
the processor is configured to:
determine a first estimated distance, a second estimated distance, and a third estimated distance corresponding to the first, second, and third phase differences, respectively
determine the phase error component based on: the first, second, and third estimated distances; the first distance between the first and second photodetectors based on the coordinates of the first and second locations; and the second distance between the second and third photodetectors based on the coordinates of the second and third locations;
determine the first, second, and third propagation components by removing the determined phase error component from each of the first, second, and third phase differences; and
provide the fourth location of the object with respect to the first, second, and third locations based on the first, second, and third propagation components, in which the fourth location is a two-dimensional location.

3. The optical position sensing system of claim 2, wherein the processor is configured to:
determine the fourth location of the object with respect to the first, second, and third locations based on a triangulation of the first, second, and third propagation components.

4. The optical position sensing system of claim 1, wherein the processor is configured to:
perform a multi-path resolution operation on the first, second, and third light signals; and
determine that the first, second, and third light signals are detected due to a direct propagation of the fourth light signal from the object based on a result of the multi-path resolution operation.

5. The optical position sensing system of claim 1, wherein the processor is configured to compute distances between the first, second, and third photodetectors and the object based on the first, second, and third phase differences between the fourth light signal and the first, second, and third light signals, and wherein the fourth light signal has at least two frequencies.

6. The optical position sensing system of claim 1, wherein the substrate includes a screen of a computing device.

7. The optical position sensing system of claim 1, wherein the object includes a light emitting diode to transmit the first light signal, and wherein each of the first, second, and third photodetectors includes a photodiode.

8. The optical position sensing system of claim 1, further comprising an analog-to-digital converter coupled to each of the first, second, and third photodetectors.

9. A method, comprising:
detecting a first light signal by a first photodetector at a first location on a surface;
detecting a second light signal by a second photodetector at a second location on the surface;
detecting a third light signal by a third photodetector at a third location on the surface;
determining, by a processor, a first phase difference between a fourth light signal transmitted by an object and the first light signal;
determining, by the processor, a second phase difference between the fourth light signal and the second light signal;
determining, by the processor, a third phase difference between the fourth light signal and the third light signal;
determining a phase error component associated with each of the first, second, and third phase differences based on estimated distances corresponding to the first, second, and third phase differences, a first distance between the first and second photodetectors calculated based on coordinates of the first and second locations, and a second distance between the second and third photodetectors calculated based on coordinates of the second and third locations;

removing, by the processor, the determined phase error component from each of the first, second, and third phase differences; and providing, by the processor, a fourth location of the object with respect to the first, second, and third locations based on the first, second, and third phase differences each having the determined phase error component removed.

10. The method of claim 9, wherein:

the first phase difference includes: a first propagation component due to a propagation of the fourth light signal from the object to the first photodetector and detected as the first light signal; and the phase error component;

the second phase difference includes: a second propagation component due to a propagation of the fourth light signal from the object to the second photodetector and detected as the second light signal; and the phase error component;

the third phase difference includes: a third propagation component due to a propagation of the fourth light signal from the object to the third photodetector and detected as the third light signal; and the phase error component; and the method further comprises:

determining, by the processor, whether each of the first, second, and third light signals has a single frequency; and responsive to determining that each of the first, second, and third light signals has the single frequency:

determining a first estimated distance, a second estimated distance, and a third estimated distance corresponding to the first, second, and third phase differences, respectively;

determining, by the processor, the phase error component based on: the first, second, and third estimated distances; the first distance between the first and second photodetectors based on the coordinates of the first and second locations; and the second distance between the second and third photodetectors based on the coordinates of the second and third locations;

determining, by the processor, the first, second, and third propagation components by removing the determined phase error component from each of the first, second, and third phase differences; and providing, by the processor, the fourth location of the object with respect to the first, second, and third locations based on the first, second, and third propagation components, in which the fourth location is a two-dimensional location.

11. The method of claim 10, further comprising determining, by the processor, the fourth location of the object with respect to the first, second, and third locations based on a triangulation of the first, second, and third propagation components.

12. The method of claim 9, further comprising:

performing, by the processor, a multi-path resolution operation on the first, second, and third light signals; and determining, by the processor, that the first, second, and third light signals are detected due to a direct propagation of the fourth light signal from the object based on a result of the multi-path resolution operation.

13. The method of claim 9, wherein the processor is configured to compute distances between the first, second, and third photodetectors and the object based on the first, second and third phase differences between the fourth light signal and the first, second, and third light signals, and wherein the fourth light signal has at least two frequencies.

14. An optical position sensing system, comprising:

a transmitting device;

a portable device including:

a surface;

a first photodetector at a first location on the surface and configured to detect a first light signal;

a second photodetector at a second location on the surface and configured to detect a second light signal;

a third photodetector at a third location on the surface and configured to detect a third light signal; and a processor configured to:

determine a first phase difference between a fourth light signal transmitted by the transmitting device and the first light signal;

determine a second phase difference between the fourth light signal and the second light signal;

determine a third phase difference between the fourth light signal and the third light signal;

determine a phase error component associated with each of the first, second, and third phase differences based on estimated distances corresponding to the first, second, and third phase differences, and a first distance between the first and second photodetectors calculated based on coordinates of the first and second locations, and a second distance between the second and third photodetectors calculated based on coordinates of the second and third locations;

remove the determined phase error component from each of the first, second, and third phase differences; and provide a fourth location of the transmitting device with respect to the first, second, and third locations based on the first, second, and third phase differences each having the determined phase error component removed.

15. The optical position sensing system of claim 14, wherein:

the first phase difference includes: a first propagation component due to a propagation of the fourth light signal from the transmitting device to the first photodetector and detected as the first light signal; and the phase error component;

the second phase difference includes: a second propagation component due to a propagation of the fourth light signal from the transmitting device to the second photodetector and detected as the second light signal; and the phase error component;

the third phase difference includes: a third propagation component due to a propagation of the fourth light signal from the transmitting device to the third photodetector and detected as the third light signal; and the phase error component; and the processor is configured to:

determine a first estimated distance, a second estimated distance, and a third estimated distance corresponding to the first, second, and third phase differences, respectively;

determine the phase error component based on: the first, second, and third estimated distances; the first distance between the first and second photodetectors based on the coordinates of the first and second locations; and the second distance between the second and third photodetectors based on the coordinates of the second and third locations;

determine the first, second, and third propagation components by removing the determined phase error component from each of the first, second, and third phase differences; and provide the fourth location of the transmitting device with respect to the first, second, and third locations based on the first, second, and third propagation components, in which the fourth location is a two-dimensional location.

16. The optical position sensing system of claim 14, wherein the processor is configured to:

perform a multi-path resolution operation on the first, second, and third light signals; and determine that the first, second, and third light signals are detected due to a direct propagation of the fourth light signal from the transmitting device based on a result of the multi-path resolution operation.

17. The optical position sensing system of claim 14, wherein the processor is configured to compute distances between the first, second, and third photodetectors and the transmitting device based on the first, second and third phase differences between the fourth light signal and the first, second, and third light signals, and wherein the fourth light signal has at least two frequencies.

18. A non-transitory computer readable medium storing instructions that, when executed by a processor, cause the processor to:

receive a first indication that a first photodetector detects a first light signal, in which the first photodetector is at a first location on a surface of a substrate;

receive a second indication that a second photodetector detects a second light signal, in which the second photodetector is at a second location on the surface;

receive a third indication that a third photodetector detects a third light signal, in which the third photodetector is at a third location on the surface;

based on the first indication, determine a first phase difference between a fourth light signal transmitted by an object and the first light signal;

based on the second indication, determine a second phase difference between the fourth light signal and the second light signal;

based on the third indication, determine a third phase difference between the fourth light signal and the third light signal;

determine a phase error component associated with each of the first, second, and third phase differences based on estimated distances corresponding to the first, second, and third phase differences, a first distance between the first and second photodetectors calculated based on coordinates of the first and second locations, and a second distance between the second and third photodetectors calculated based on coordinates of the second and third locations;

remove the determined phase error component from each of the first, second, and third phase differences; and provide a fourth location of the object with respect to the first, second, and third locations based on the first, second, and third phase differences having the determined phase error component removed.

19. The non-transitory computer readable medium of claim 18, wherein:

the first phase difference includes: a first propagation component due to a propagation of the fourth light signal from the object to the first photodetector and detected as the first light signal; and the phase error component;

the second phase difference includes: a second propagation component due to a propagation of the fourth light signal from the object to the second photodetector and detected as the second light signal; and the phase error component;

the third phase difference includes: a third propagation component due to a propagation of the fourth light signal from the object to the third photodetector and detected as the third light signal; and the phase error component; and the non-transitory computer readable medium further stores instructions that, when executed by the processor, cause the processor to:

determining whether each of the first, second, and third light signals has a single frequency;

responsive to determining that each of the first, second, and third light signals has the single frequency:

determining a first estimated distance, a second estimated distance, and a third estimated distance corresponding to the first, second, and third phase differences, respectively;

determine the phase error component based on: the first, second, and third estimated distances; the first distance between the first and second photodetectors based on the coordinates of the first and second locations; and the second distance between the second and third photodetectors based on the coordinates of the second and third locations;

determine the first, second, and third propagation components by removing the determined phase error component from each of the first, second, and third phase differences; and provide the fourth location of the object with respect to the first, second, and third locations based on the first, second, and third propagation components, in which the fourth location is a two-dimensional location.

20. The non-transitory computer readable medium of claim 18, further storing instructions that, when executed by the processor, cause the processor to:

perform a multi-path resolution operation on the first, second, and third light signals; and determine that the first, second, and third light signals are detected due to a direct propagation of the fourth light signal from the object based on a result of the multi-path resolution operation.

21. The non-transitory computer readable medium of claim 18, further storing instructions that, when executed by the processor, cause the processor to compute distances between the first, second, and third photodetectors and the object based on the first, second, and third phase differences between the fourth light signal and the first, second, and third light signals, wherein the fourth light signal has at least two frequencies.

22. An optical position sensing system, comprising:

a substrate having a surface;

a first photodetector at a first location on the surface and configured to detect a first light signal;

a second photodetector at a second location on the surface and configured to detect a second light signal; and a processor configured to:

determine a first phase difference between a fourth light signal transmitted by an object and the first light signal, the fourth light signal having a first frequency and a second frequency;

determine a second phase difference between the fourth light signal and the second light signal;

determine a phase error component associated with each of the first and second phase differences based on estimated distances corresponding to the first and second phase differences, a first distance between the first photodetector and the object calculated based on the first phase difference, and a second distance between the second photodetector and the object calculated based on the second phase difference;

remove the determined phase error component from each of the first and second phase differences; and determine a fourth location of the object with respect to the first and second locations based on the first and second phase differences each having the determined phase error component removed, in which the fourth location is a two-dimensional location.

23. The optical position sensing system of claim 22, wherein the substrate is a screen of a computing device.

\* \* \* \* \*